(No Model.) 2 Sheets—Sheet 2.
T. A. EDISON.
MEANS FOR TRANSMITTING SIGNALS ELECTRICALLY.
No. 465,971. Patented Dec. 29, 1891.
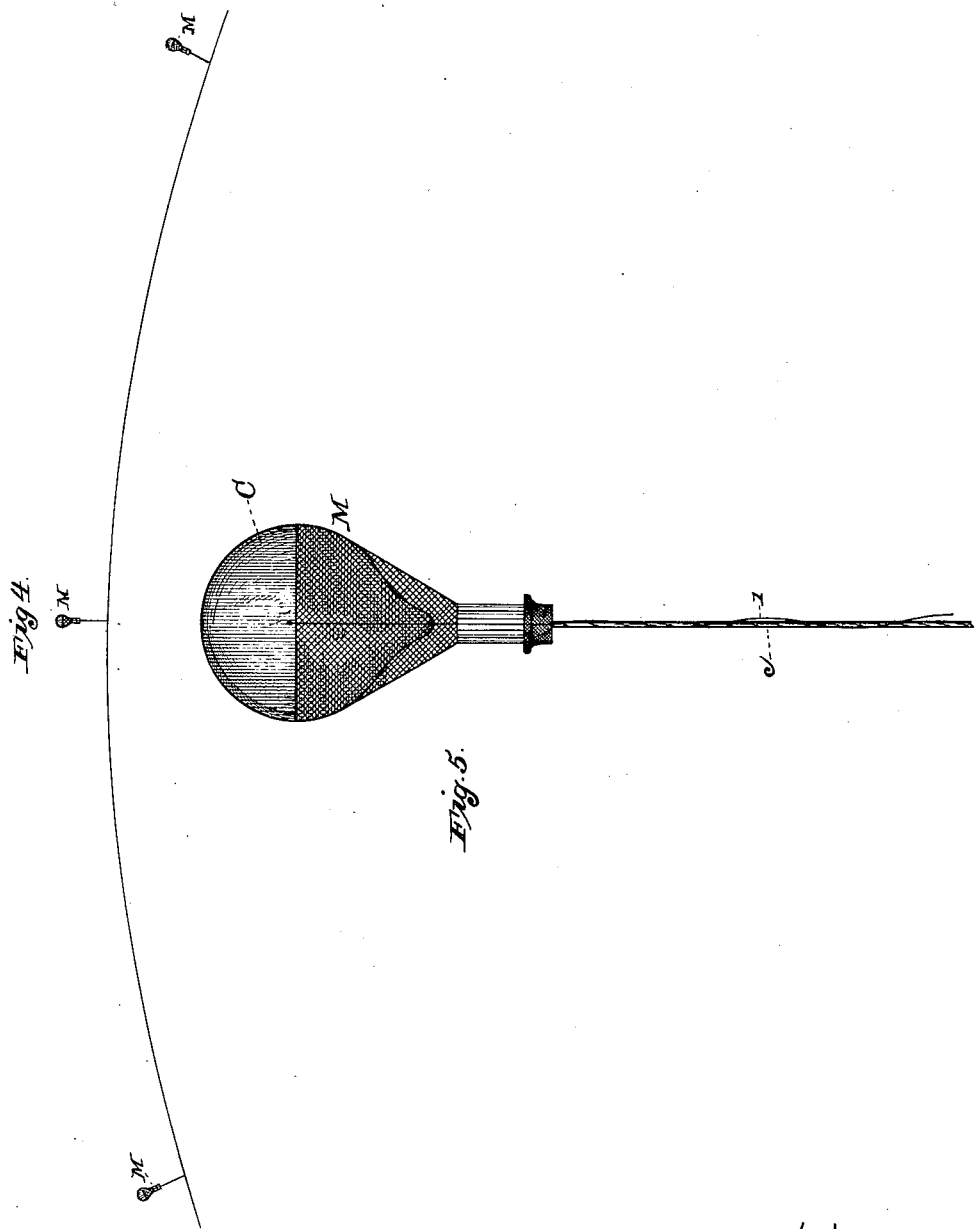

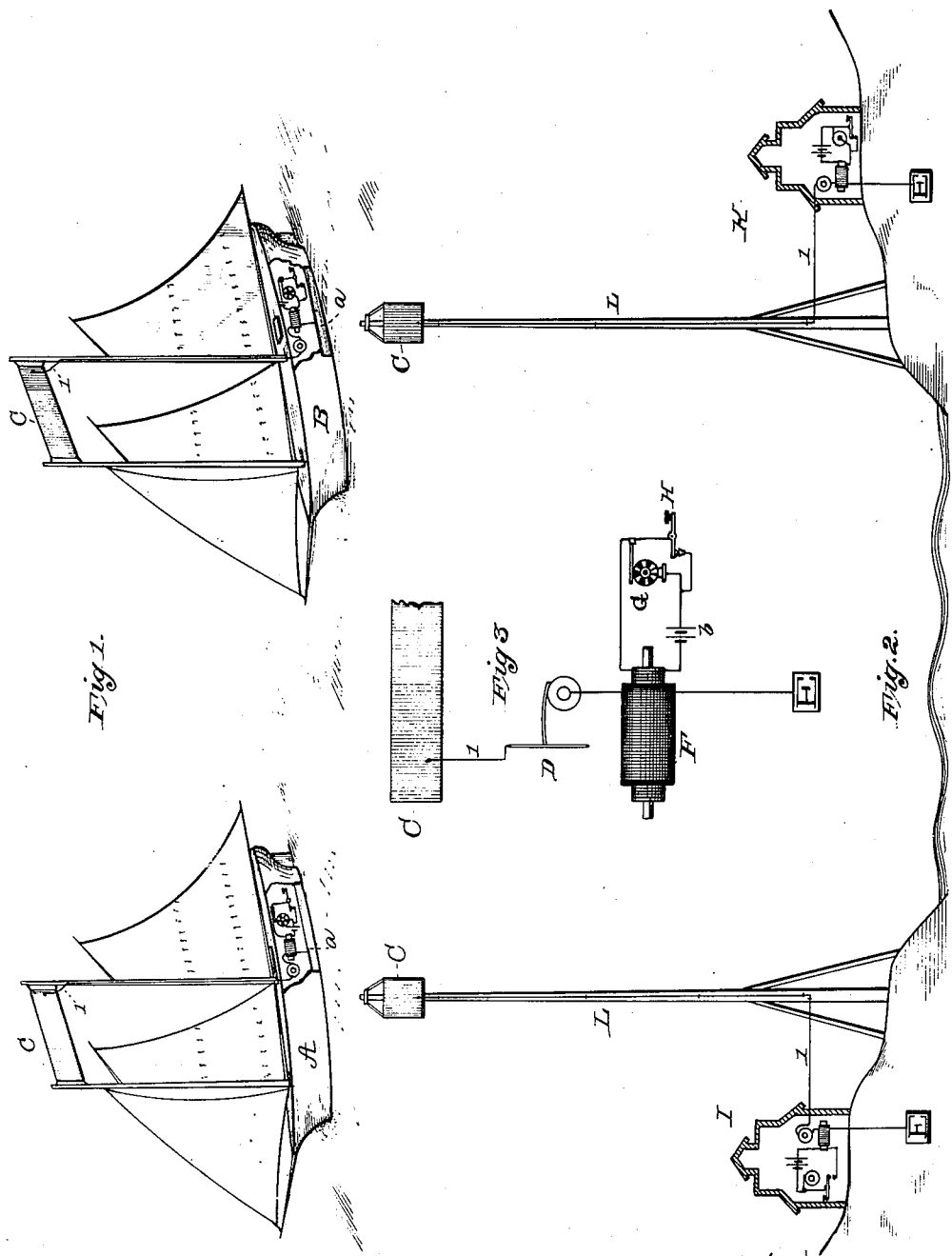

UNITED STATES PATENT OFFICE.

THOMAS A. EDISON, OF MENLO PARK, NEW JERSEY.

MEANS FOR TRANSMITTING SIGNALS ELECTRICALLY.

SPECIFICATION forming part of Letters Patent No. 465,971, dated December 29, 1891.

Application filed May 23, 1885. Serial No. 166,455. (No model.)

*To all whom it may concern:*

Be it known that I, THOMAS A. EDISON, of Menlo Park, in the county of Middlesex and State of New Jersey, have discovered a new and useful Improvement in Means for Transmitting Signals Electrically, (Case No. 652,) of which the following is a specification.

The present invention consists in the signaling system having elevated induction plates or devices, as hereinafter described and claimed.

I have discovered that if sufficient elevation be obtained to overcome the curvature of the earth's surface and to reduce to the minimum the earth's absorption electric telegraphing or signaling between distant points can be carried on by induction without the use of wires connecting such distant points. This discovery is especially applicable to telegraphing across bodies of water, thus avoiding the use of submarine cables, or for communicating between vessels at sea, or between vessels at sea and points on land; but it is also applicable to electric communication between distant points on land, it being necessary, however, on land (with the exception of communication over open prairie) to increase the elevation in order to reduce to the minimum the induction-absorbing effect of houses, trees, and elevations in the land itself. At sea from an elevation of one hundred feet I can communicate electrically a great distance, and since this elevation or one sufficiently high can be had by utilizing the masts of ships signals can be sent and received between ships separated a considerable distance, and by repeating the signals from ship to ship communication can be established between points at any distance apart or across the largest seas and even oceans. The collision of ships in fogs can be prevented by this character of signaling, by the use of which, also, the safety of a ship in approaching a dangerous coast in foggy weather can be assured. In communicating between points on land poles of great height can be used or captive balloons. At these elevated points, whether upon the masts of ships, upon poles or balloons, condensing-surfaces of metal or other conductor of electricity are located. Each condensing-surface is connected with earth by an electrical conducting-wire. On land this earth connection would be one of usual character in telegraphy. At sea the wire would run to one or more metal plates on the bottom of the vessel where the earth connection would be made with the water. The high-resistance secondary circuit of an induction-coil is located in circuit between the condensing-surface and the ground. The primary circuit of the induction-coil includes a battery and a device for transmitting signals, which may be a revolving circuit-breaker operated continually by a motor of any suitable kind, either electrical or mechanical, and a key normally short-circuiting the circuit-breaker or secondary coil. For receiving signals I locate in said circuit between the condensing-surface and the ground a diaphragm-sounder, which is preferably one of my electro-motograph telephone-receivers. The key normally short-circuiting the revolving circuit-breaker, no impulses are produced in the induction-coil until the key is depressed, when a large number of impulses are produced in primary, and by means of the secondary corresponding impulses or variations in tension are produced at the elevated condensing-surface, producing thereat electrostatic impulses. These electrostatic impulses are transmitted inductively to the elevated condensing-surface at the distant point and are made audible by the electro-motograph connected in the ground-circuit with such distant condensing-surface. The intervening body of air forms the dielectric of the condenser, the condensing-surfaces of which are connected by the earth. The effect is a circuit in which is interposed a condenser formed of distantly-separated and elevated condensing-surfaces with the intervening air as a dielectric.

In the accompanying drawings, forming a part hereof, Figure 1 is a view showing two vessels placed in communication by my discovery; Fig. 2, a view showing signaling-stations on opposite banks of a river; Fig. 3, a separate view, principally in diagram, of the apparatus; Fig. 4, a diagram of a portion of the earth's surface, showing communication by captive balloons; Fig. 5, a view of a single captive balloon constructed for use in signaling.

A and B are two vessels, each having a metallic condensing-surface C, supported at the heads of the masts. This condensing-surface may be of canvas covered with flexible sheet metal or metallic foil secured thereto in any suitable way. From the condensing-surface C a wire 1 extends to the hull of each vessel and through the signal receiving and transmitting apparatus to a metallic plate $a$ on the vessel's bottom. This wire extends through an electro-motograph telephone-receiver D or other suitable receiver, and also includes the secondary circuit of an induction-coil F. In the primary of this induction-coil is a battery $b$ and a revolving circuit-breaker G. This circuit-breaker is revolved rapidly by a motor, (not shown,) electrical or mechanical. It is short-circuited normally by a back point-key H, by depressing which the short circuit is broken and the circuit-breaker breaks and makes the primary circuit of the induction-coil with great rapidity. This apparatus is more particularly shown in Fig. 3.

In Fig. 2, I K are stations on land, having poles L supporting condensing-surfaces C, which may be light cylinders or frames of wood covered with sheet metal. These drums are adapted to be raised and lowered by block and tackle and are connected by wires with earth-plates through signal receiving and transmitting apparatus, such as has already been described.

In Fig. 5, M is a captive balloon having condensing-surfaces C of metallic foil. The ground-wire 1 is carried down the rope $c$, by which the balloon is held captive. In Fig. 4 three of these captive balloons are represented in position to communicate from one to the other and to repeat to the third, the curvature of the earth's surface being represented.

What I claim as my discovery is—

1. Means for signaling between stations separated from each other, consisting of an elevated condensing surface or body at each station, a transmitter operatively connected to one of said condensing-surfaces for varying its electrical tension in conformity to the signal to be transmitted, and thereby correspondingly varying the tension of the other condensing-surface, and a signal-receiver operatively connected to said other condensing-surface, substantially as described.

2. Means for signaling between stations separated from each other, consisting of a condensing-surface at each station at such an elevation that a straight line between said surfaces will avoid the curvature of the earth's surface and intervening induction-absorbing obstacles, a signal-transmitter operatively connected to one of said surfaces for varying its electrical tension and thereby correspondingly varying the electrical tension of the other surface, and a signal-receiver operatively connected to the latter surface, substantially as described.

3. Means for signaling between stations separated from each other, consisting of an elevated condensing surface or body at each station, an induction-transmitter operatively connected to one of said condensing-surfaces for varying its electrical tension in conformity to the signal to be transmitted and thereby correspondingly varying the tension of the other condensing-surface, and a signal-receiver operatively connected to said other condensing-surface, substantially as described.

4. Means for signaling between stations separated from each other, consisting of an elevated metallic condensing-surface at each station, a conductor from the surface at one station, including the secondary of an induction-coil, a primary coil including a source of current and a transmitting key or device for changing the primary circuit for signaling, and a conductor from the condensing-surface at the other station, including a telephone-receiver, substantially as described.

5. Means for signaling between stations separated from each other, consisting of an elevated metallic condensing-surface at each station, a conductor from the surface at one station, including a signal-receiver and the secondary of an induction-coil, a primary coil including a source of current and means for making and breaking or varying the primary circuit for signaling, and a conductor from the condensing-surface at the other station, including similar receiving and transmitting instruments, substantially as described.

This specification signed and witnessed this 14th day of May, 1885.

THOS. A. EDISON.

Witnesses:
PHILIP S. DYER,
JOHN C. TOMLINSON.